United States Patent [19]

Sherk et al.

[11] Patent Number: 4,807,672

[45] Date of Patent: Feb. 28, 1989

[54] EMPTY-FULL INDICATOR FOR SOLIDS TANKS AND BLENDERS

[75] Inventors: Fred T. Sherk; Jimmy M. Gilbreth, both of Bartlesville, Okla.

[73] Assignee: Phillips Petroleum Company, Bartlesville, Okla.

[21] Appl. No.: 116,854

[22] Filed: Nov. 4, 1987

[51] Int. Cl.$^4$ .............................................. H01H 35/00
[52] U.S. Cl. .......................................... 141/1; 222/54; 340/617
[58] Field of Search .................. 141/1, 39; 200/61.21; 222/54; 340/614, 616, 617

[56] References Cited

U.S. PATENT DOCUMENTS

| | | | |
|---|---|---|---|
| Re. 25,687 | 11/1964 | Arthur et al. | 366/164 |
| 1,035,572 | 8/1912 | Gasch | 200/61.04 |
| 2,520,500 | 8/1950 | Gray | 340/617 X |
| 2,526,191 | 10/1950 | Barker | 200/61.21 |
| 2,640,977 | 6/1953 | Parisi | 340/246 |
| 2,696,114 | 12/1954 | Cummings | 340/617 X |
| 2,846,879 | 8/1958 | Kauffman et al. | 340/617 X |
| 3,583,681 | 6/1971 | Brown | 366/163 |
| 3,712,137 | 1/1973 | Zavod | 73/295 |
| 3,831,159 | 8/1974 | Parsons | 200/61.21 X |
| 3,935,835 | 2/1976 | Rinck | 116/118 |
| 3,972,234 | 8/1976 | Osojnak | 73/303 |
| 4,219,132 | 8/1980 | Scheppele | 200/61.21 X |

FOREIGN PATENT DOCUMENTS 490532 2/1928 Fed. Rep. of Germany .

Primary Examiner—Mark J. Thronson
Attorney, Agent, or Firm—Paul S. Chirgott

[57] ABSTRACT

A method for controlling the filling status of particulate solids in a solids container is provided using an apparatus comprising an empty/full indication device comprising a conduit structure, having a vertically opened upper end and a vertically opened lower end, wherein the vertically opened upper end is in open communication with the upper end portion of the solids container at the location of a predetermined full level and the vertically opened lower is in open communication with the lower end portion of the solids container at the location of a predetermined empty level. The conduit structure has a configuration such that when the level of the particulate solids being fed into the solids container reaches the predetermined full level, the particulate solids flow into the vertically opened upper end of the conduit structure by gravity through to the vertically opened lower end of the conduit structure; and, as the level of particulate solids being dispersed out of the solids container drops below the predetermined empty level, substantially of the particulate material within the conduit structure flows, by gravity, into the lower end portion of the solids container.

13 Claims, 3 Drawing Sheets

EMPTY-FULL INDICATOR FOR SOLIDS TANKS AND BLENDERS

FIELD OF THE INVENTION

This invention broadly pertains to a device for indicating the level at which a quantity of granular material stands within a solids container. Particularly, this invention pertains to a device for determining when the granular material being fed into a container has reached a predetermined full level and when granular material being dispersed from the same container has reached a predetermined empty level.

BACKGROUND

In various industries, granular material of various consistencies is stored in a solids container. Ordinarily, the particulate material is loaded into the container through the upper end thereof and is withdrawn from the container through its lower end.

If the solids container is used to continuously feed a given amount of a granular material into some receptacle, it is highly desirable to know when the container is full and/or when the container is empty. Many methods for determining the filling and feeding status of a granular material into and out of a solids container, respectively, have been proposed. Examples of these methods range from visual observations to highly sophisticated electrical sensors. Most of these methods, however, have inherent problems associated therewith. For example, visually observing the level of granular material being fed into a solids container lacks uniformity. This problem can result in either underfilling or overfilling the chosen receptacle. Electronic sensors, on the other hand, generally result in mechanical problems due to the high concentrations of dust resulting from filling the solids container.

SUMMARY OF THE INVENTION

This invention provides a device for indicating the full and empty positions in a solids container comprising a conduit means having a vertically opened upper end and a vertically opened lower end wherein the vertically opened upper end is in open communication with a predetermined full level of the solids container and the vertically opened lower end is in open communication with a predetermined empty level of the same container. A pressurized gas source is connected to the conduit means at a location intermediate the vertically opened upper end and the vertically opened lower end of the conduit means. A pressure sensing means determines the pressure differential between the pressure within the conduit means and a predetermined pressure reference point.

One object of this invention is to provide an apparatus which will continuously feed a uniform amount of a granular material into a chosen receptacle.

Another object of this invention is to provide an improved method for controlling the filling and feeding processes of granular material into and out of a solids container, respectively.

Other objects, aspects and advantages of the present invention will become apparent to those skilled in the art upon reading the following detailed description when considered in connection with the accompanying drawings and appended claims.

BRIEF DESCRIPTION OF THE DRAWINGS

A more complete appreciation of the invention and many attendant advantages thereof will be readily obtained as the same becomes better understood by reference to the following detailed description when considered in connection with the accompanying figures briefly described below.

DETAILED DESCRIPTION OF THE INVENTION

Figure 1:
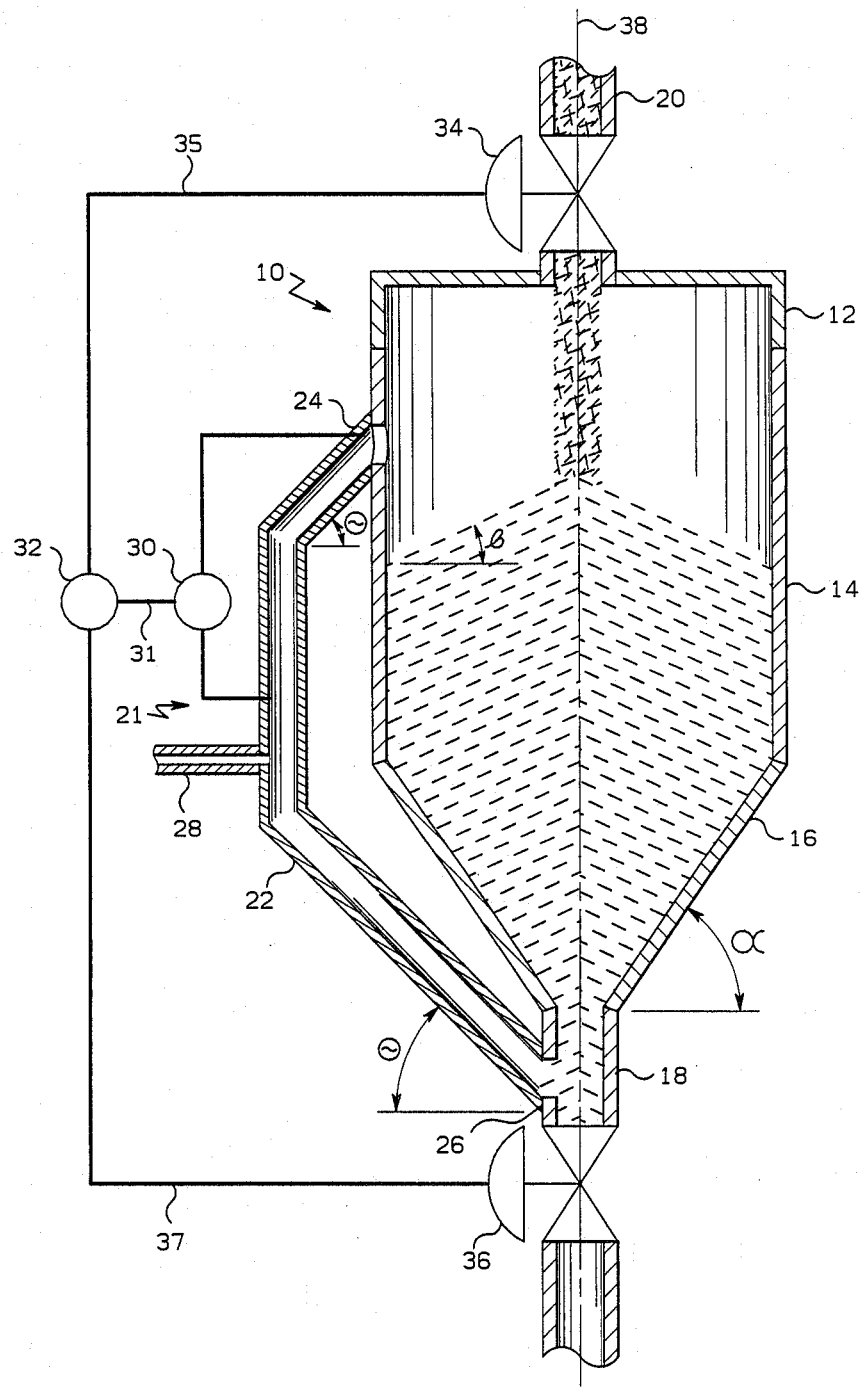
FIG. 1 is a cross-sectional view of one embodiment of a solids container having attached thereto a device for indicating full and empty positions of particulate material contained therein.

In general, FIG. 1 illustrates one embodiment of the empty/full indication device of this invention. Specifically, the embodiment illustrated in FIG. 1 is that of a solids container 10 having an upper end portion 12, a medial portion 14, and a lower end portion 16. Upper end portion 12 and medial portion 14 of solids container 10 define a generally vertical cavity. Lower end portion 16 of solids container 10 defines a converging cavity.

In FIG. 1, the lower end portion 16 of solids container 10 is represented as a frustoconical cavity which opens into outlet means 18. Outlet means 18 can open directly into any suitable location. Examples of such suitable locations include, but are not limited to, feed hoppers of processing machinery, pellet blenders, weigh belt conveyers, air conveyers, railroad cars, or the like.

Solids container 10 further comprises an inlet means 20 in open communication with its upper end portion 12. Inlet means 20 can optionally include a storage vessel (not shown) which is in direct communication with the upper end portion 12 of solids container 10.

The empty/full indication device, generally identified as item 21, comprises a conduit means 22 having a vertically opened upper end 24 and a vertically opened lower end 26. The vertically opened upper end 24 of conduit means 22 is in open communication with the upper end portion 12 of solids container 10 at the location of the predetermined full level. The vertically opened lower end 26 of conduit means 22 is in open communication with the lower end portion 16 of solids container 10 at the location of the predetermined empty level. The empty/full indication device 22 can be fully contained externally of solids container 10; partially contained within the cavity of solids container 10; or fully within the cavity of solids container 10.

The phrases "vertically opened upper end" and "vertically opened lower end", used to describe the configuration of the ends of conduit means 22, refer to an opened end of the conduit, wherein the opening is along a generally vertical axis.

The configuration of conduit means 22 is critical only to the extent that when the level of particulate solids being fed into storage container 10 reaches the predetermined full level, the particulate solids will flow by gravity into the vertically opened upper end 24 of conduit means 22 and through to the vertically opened lower end 26 of conduit means 22.

For a granular material to flow by gravity from the vertically opened upper end 24 of conduit 22 through to the vertically opened lower end 26 of the same conduit, any converging or diverging angular slopes of conduit 22 which form an angle $\theta$ (theta) with a horizontal plane perpendicular to the longitudinal axis 38 of solids container 10 must be at least equal to the angle of repose of the granular material being fed into container 10.

As used herein, the phrase "angle of repose" refers to the angle from the horizontal which the particulate material being fed into a container assumes at rest. Determining the angle of repose of a given granular material is known to one skilled in the art. Referring to FIG. 1, the angle of repose of the particulate material being fed into container 10 is identified by the symbol $\beta$ (beta).

The empty/full indication device 21 further comprises a pressurized gas source entering conduit 22 through conduit 28. Conduit 28 is located at a point intermediate the vertically opened upper end 24 and the vertically lower end 26 of conduit 22.

Further included in the empty/full indication device 21 is a pressure sensing means 30. Pressure sensing means 30 is used to measure a pressure differential between the pressure within conduit 22 and a predetermined reference point at any given time. In the embodiment illustrated in FIG. 1, the predetermined pressure reference point is located at the vertically opened upper end 24 of conduit 22.

The calibration of sensing means 30 is such that when no particulate material is present in empty/full indicator device a low pressure signal is transmitted via line 31. When particulate material begins to enter the upper end 24 of conduit means 22, the pressure within conduit means 22 will increase. The calibration of sensing means 30 is such that when conduit means 22 is filled with particulate material, a high pressure signal is transmitted via line 31.

The low pressure and high pressure signals transmitted by sensing means 30 via line 31 can be used to activate any suitable device. Examples of such suitable devices include, but are not limited to, alarms and valve controllers.

In the embodiment illustrated in FIG. 1, the signals transmitted by sensing means 30 are transmitted via line 31 to valve controller 32. Valve controller 32 controls the position of gate valve 34, associated with inlet means 20 and gate valve 36 associated with outlet means 18.

In the operation of the embodiment illustrated in FIG. 1, before supplying any pellets to solids container 10, gate valve 36 is in the fully closed position. Moreover, air is supplied into conduit means 22 through conduit means 28. Pressure sensing means 30 senses the difference in pressure, if any, between the pressure within conduit means 22 and a predetermined pressure reference point. A low pressure signal is then transmitted by sensing means 30 via line 31 to valve controller 32. In response to the low pressure signal, valve controller simultaneously transmits a first signal via line 37 which closes gate valve 36 and a second signal via line 35 which opens gate valve 34, thus permitting solid particles to enter solids container 10.

As solid particles are fed into the cavity of solids container 10, they form an angle of repose with a horizontal claim perpendicular to the longitudinal axis 38 of solids container 10. When the level of the solids material along the inside wall surface of solids container 10 reaches the predetermined full level, the solids material will enter the vertically opened upper end 24 of conduit means 22 and flow by gravity to the vertically opened lower end 26 of conduit means 22. Since the vertically opened lower end of conduit means 22 is temporarily blocked by the solid material earlier fed into solids container 10, conduit means 22 will begin the fill.

As conduit means 22 fills with the solids material, the pressure within the conduit means will increase. When conduit means 22 is completely filled with the solids material, a high pressure signal is transmitted via line 31 to valve controller 32. In response to the high pressure signal, valve controller 32 will transmit a signal via line 35 and 37 which simultaneously closes gate valve 34 and opens gate valve 36, respectively.

When gate valve 36 is opened, the solid particles contained in the cavity of solids container 10 will begin to be fed through outlet means 18. The dispersing of the solids material within the cavity of solids container 10 through outlet means 18 does not substantially affect the level of the solids material contained within conduit means 22 until the level of solids material contained within solids container 10 falls below vertically opened lower end 26 of conduit means 22. When this occurs, the solids material contained within conduit 22 will be dispersed into outlet means 18. As the level of solids material contained within conduit means decreases, the pressure differential within conduit means 22 and the predetermined reference point will also decrease. When the pressure differential sensed by sensing means 30 reaches the low pressure level, a low pressure signal is transmitted via line 31 to valve controller 32. In response to the low pressure signal, valve controller 32 transmits a signal via lines 37 and 35 which simultaneously closes gate valve 36 and opens gate valve 34, respectively.

Figure 2:
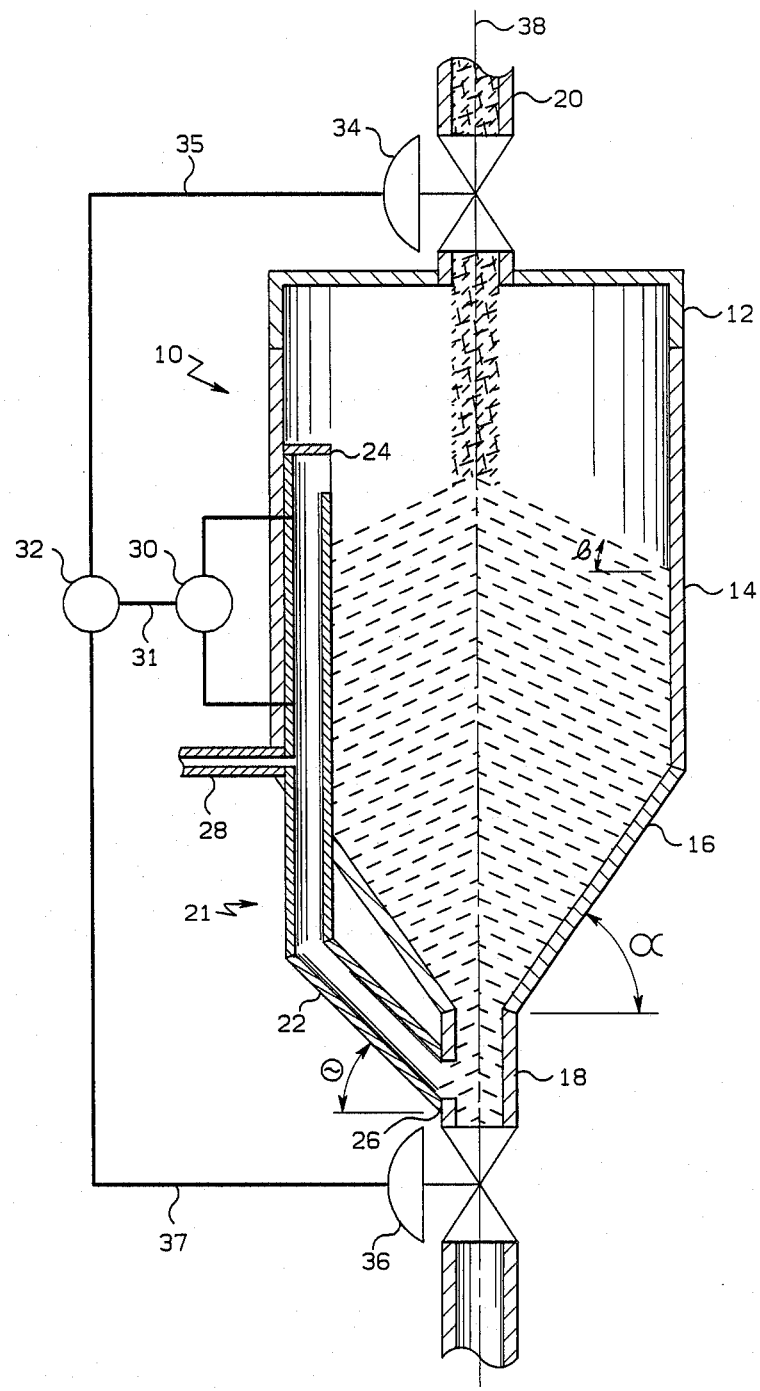
FIG. 2 is a cross-sectional view of a second embodiment of a solids container having attached thereto a device for indicating full and empty positions of particulate material contained therein.
Figure 3:
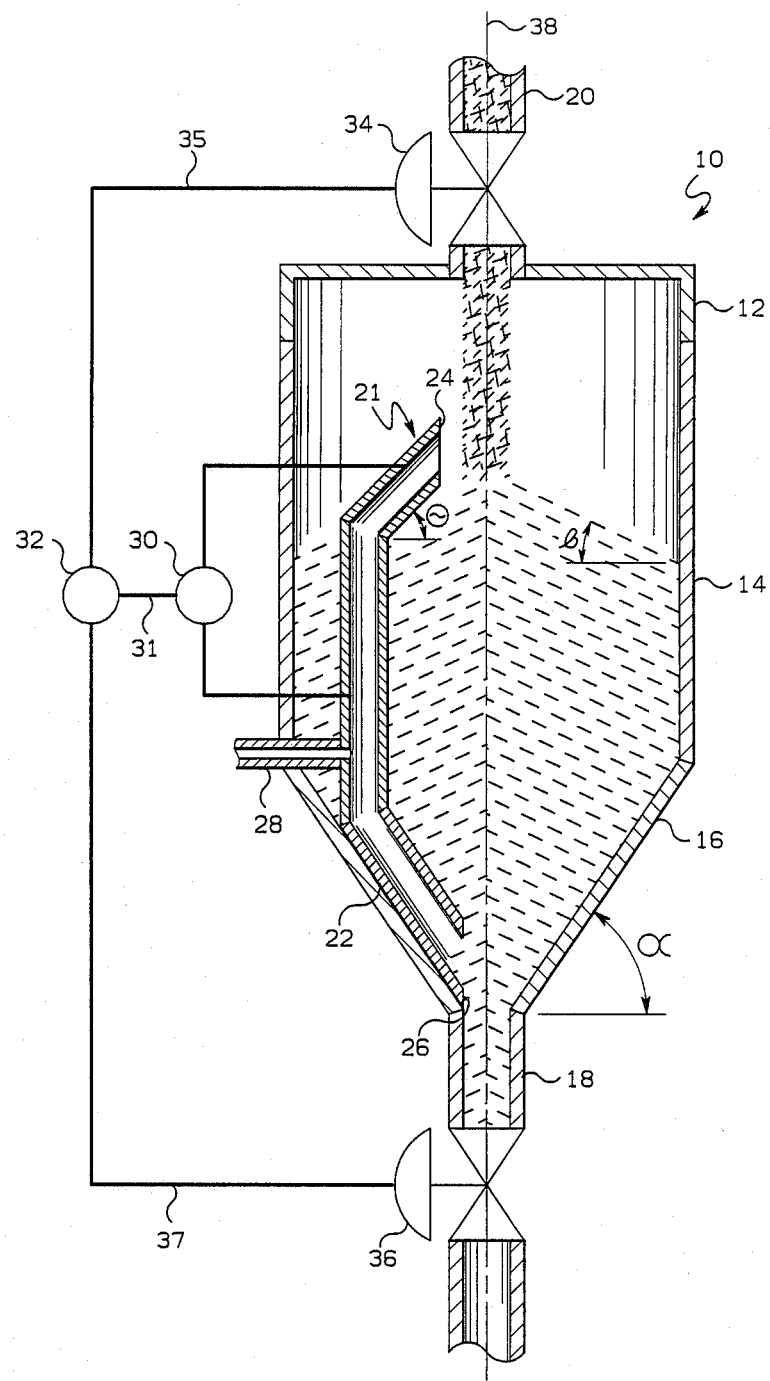
FIG. 3 is a cross-sectional view of a third embodiment of a solids container having attached thereto a device for indicating full and empty positions of particulate material contained therein.

Additional embodiments of the empty/full indication device of this invention are illustrated in FIGS. 2 and 3. As described earlier, empty/full indication device 21 can be fully contained externally of solids container 10 (i.e., FIG. 1), partially contained within the cavity of solids container 10 (i.e., FIG. 2), or fully contained within the cavity of solids container 10 (i.e., FIG. 3).

In the embodiments illustrated in FIGS. 2 and 3, the operation of the empty/full indication device is identical to that of the embodiment demonstrated in FIG. 1.

It is evident from the foregoing that various modifications can be made to embodiments of this invention without departing from the spirit and scope thereof, which will be apparent to those skilled in the art.

Having thus described the invention, it is claimed as follows:

1. An apparatus suitable for dispersing particulate solids comprising:
   (a) a vessel having an upper end portion with a predetermined full level, a medial portion, and a lower end portion with a predetermined empty level, said vessel having a longitudinal axis passing therethrough;
   (b) an inlet means opening into said upper end portion of said vessel for feeding particulate solids into said vessel, wherein the feeding of the particulate solids has associated therewith an angle of repose, wherein said angle of repose is the angle formed by the slope of the particulate material when being fed into said vessel and a horizontal plane perpendicular to said longitudinal axis of said vessel;

(c) an outlet means in direct communication with said lower end portion of said vessel for removing particulate solids from said vessel, wherein said lower end portion of said vessel converges from said medial portion of said vessel to said outlet means at an angle α formed by the slope of said converging lower end portion of said vessel and a horizontal plane perpendicular to said longitudinal axis of said vessel, wherein said angle alpha is at least equal to said angle of repose of the particulate material being fed into said vessel;

(d) a conduit means, having a vertically opened upper end and a vertically opened lower end, wherein said vertically opened upper end is in open communication with said upper end portion of said vessel at the location of said predetermined full level and said vertically opened lower end is in open communication with said lower end portion of said vessel at the location of said predetermined empty level, said conduit means having a configuration such that when the level of the particulate solids being fed into said vessel reaches said predetermined full level, the particulate solids will flow into said vertically opened upper end of said conduit means by gravity through to said vertically opened lower end of said conduit means, and as the level of the particulate solids being dispersed out of said vessel, drops below said predetermined empty level, substantially all of the particulate material within said conduit means will flow by gravity into said lower end portion of said vessel;

(e) a pressurized gas source connected to said conduit means at a location intermediate said vertically opened upper end and said vertically opened lower end of said conduit means; and (f) a pressure sensing means for measuring a pressure differential between the pressure within said conduit means and a predetermined pressure reference point.

2. An apparatus as recited in claim 1 wherein said pressure reference point is located at the vertically opened upper end of said conduit means.

3. An apparatus as recited in claim 1 wherein said conduit means has diverging and converging angular slopes forming angles θ (theta) with a horizontal plane perpendicular to said longitudinal axis of said vessel wherein each said angle theta is at least equal to said angle of repose of the particulate material being fed into said vessel.

4. An apparatus as recited in claim 3 wherein said conduit means is placed externally to said vessel.

5. An apparatus suitable for dispersing particulate solids having associated therewith an angle of repose comprising:

(a) a vessel having an upper end portion with a predetermined full level, a medial portion, and a lower end portion with a predetermined empty level, said vessel having a longitudinal axis passing therethrough;

(b) an inlet means opening into said upper end portion of said vessel for feeding particulate solids into said vessel;

(c) an outlet means in direct communication with said lower end portion of said vessel for removing particulate solids from said vessel, wherein said lower end portion of said vessel converges from said medial portion of said vessel to said outlet means at an angle α formed by the slope of said converging lower end portion of said vessel and a horizontal plane perpendicular to said longitudinal axis of said vessel, wherein said angle alpha is at least equal to said angle of repose of the particulate material being fed into said vessel;

(d) a conduit means, having a vertically opened upper end and a vertically opened lower end, wherein said vertically opened upper end is in open communication with said upper end portion of said vessel at the location of said predetermined full level and said vertically opened lower end is in open communication with said lower end portion of said vessel at the location of said predetermined empty level, said conduit means having a configuration such that when the level of the particulate solids being fed into said vessl reaches said predetermined full level, the particulate solids will flow by gravity into said vertically opened upper end of said conduit means through to said vertically opened lower end of said conduit means, and when the level of the particulate solids being dispersed from said vessel drops below said predetermined empty level, substantially all of the particulate material within said conduit means will flow by gravity into said lower end portion of said vessel;

(e) a pressurized gas source connected to said conduit means at a location intermediate said vertically opened upper end and said vertically opened lower end of said conduit means; and (f) a pressure sensing means for measuring a pressure differential between the pressure within said conduit means and a predetermined pressure reference point.

6. An apparatus as recited in claim 5 wherein said pressure reference point is located at the vertically opened upper end of said conduit means.

7. An apparatus as recited in claim 5 wherein said conduit means has diverging and converging angular slopes forming angles θ with a horizontal planes perpendicular to said longitudinal axis of said vessel wherein each said angle theta is at least equal to said angle of repose of the particulate material being fed into said vessel.

8. An apparatus as recited in claim 7 wherein said conduit means is placed externally to said vessel.

9. A process for controlling the filling status of particulate solids in an apparatus comprising:

a vessel having an upper end portion with a predetermined full level, a medial portion, and an lower end portion with a predetermined empty level;

an inlet means for feeding particulate solids into said vessel;

an outlet means for removing particulate solids from said vessel;

a conduit means, having a vertically opened upper end and a vertically opened lower end, wherein said vertically opened upper end is in open communication with said upper end portion of said vessel at the location of said predetermined full level and said vertically opened lower end is in open communication with said lower end portion of said vessel at the location of said predetermined empty level;

a pressurized gas source connected to said conduit means at a location intermediate said vertically opened upper end and said vertically opened lower end of said conduit means; and a pressure sensing means for measuring a pressure differential between the pressure within said conduit means and a predetermined pressure reference point, said process comprising:

(a) passing pressurized gas from said pressurized gas source through said conduit means;

(b) sensing the gas pressure within said conduit means and at said pressure reference point and measuring the pressure differential with said pressure sensing means;

(c) feeding particulate solids into said vesel such that when the level of said particulate solids reaches said predetermined full level, said particulate solids will flow by gravity into said vertically opened upper end of said conduit means through to said vertically opened lower end of said conduit means, thereby causing a first change of gas pressure within said conduit means;

(d) responsive to said first change of gas pressure within said conduit means, terminating said feeding of said particulate solids into said vessel;

(e) dispersing particulate solids from said vessel such that when the level of said particulate solids drops below said predetermined empty level, substantially all of said particulate material within said conduit means will flow by gravity through said vertically opened lower end of said conduit means into said lower end portion of said vessel, thereby causing a second change of gas pressure within said conduit means; and (f) responsive to said second change of gas pressure within said conduit means, terminating said dispersing of said particulate solids from said vessel.

10. A process as recited in claim 9 wherein said pressure reference point is sensed at said vertically opened upper end of said conduit means.

11. A process as recited in claim 9 wherein further responsive to said first change of gas pressure within said conduit means, the dispersing of said particulate solids from said vessel is initiated.

12. A process as recited in claim 9 wherein further responsive to said second change of gas pressure within said conduit means, the feeding of said particulate solids into said vessel is initiated.

13. A process as recited in claim 12 wherein further responsive to said second change of gas pressure within said conduit means, the feeding of said particulate solids into said vessel is initiated.

* * * * *